Dec. 25, 1962  G. GÖBEL  3,070,076
HEATING BOILER
Filed Dec. 4, 1959  13 Sheets-Sheet 1

INVENTOR:
GERHARD GÖBEL
BY
Mestern, Ross & Mestern

Dec. 25, 1962 G. GÖBEL 3,070,076
HEATING BOILER
Filed Dec. 4, 1959 13 Sheets-Sheet 4

INVENTOR:
GERHARD GÖBEL
BY
Mestern, Ross & Mestern

Dec. 25, 1962 G. GÖBEL 3,070,076
HEATING BOILER
Filed Dec. 4, 1959 13 Sheets-Sheet 6

INVENTOR:
GERHARD GÖBEL
BY
Mestern, Ross & Mestern

Dec. 25, 1962 G. GÖBEL 3,070,076
HEATING BOILER
Filed Dec. 4, 1959 13 Sheets-Sheet 7

INVENTOR:
GERHARD GÖBEL
BY
Mestern, Ross & Mestern

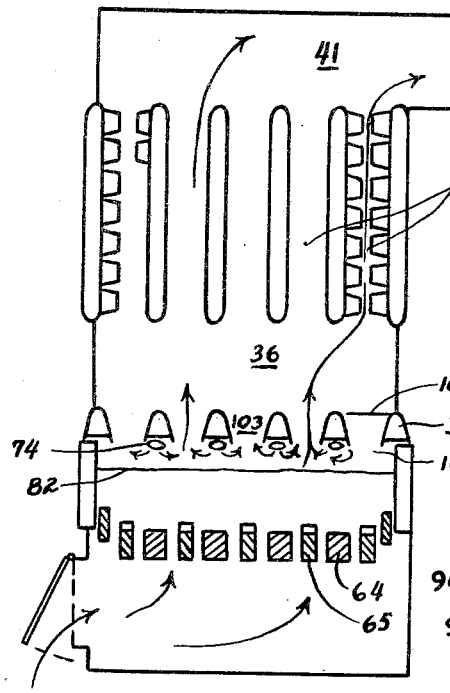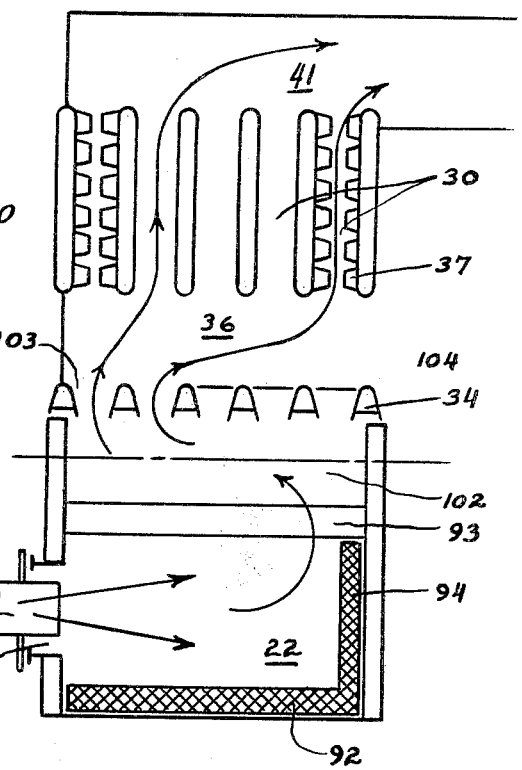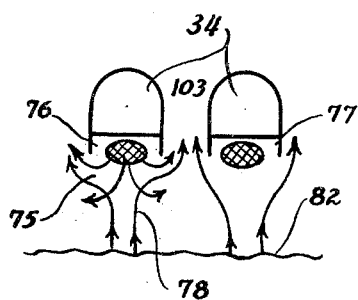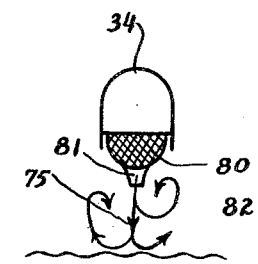

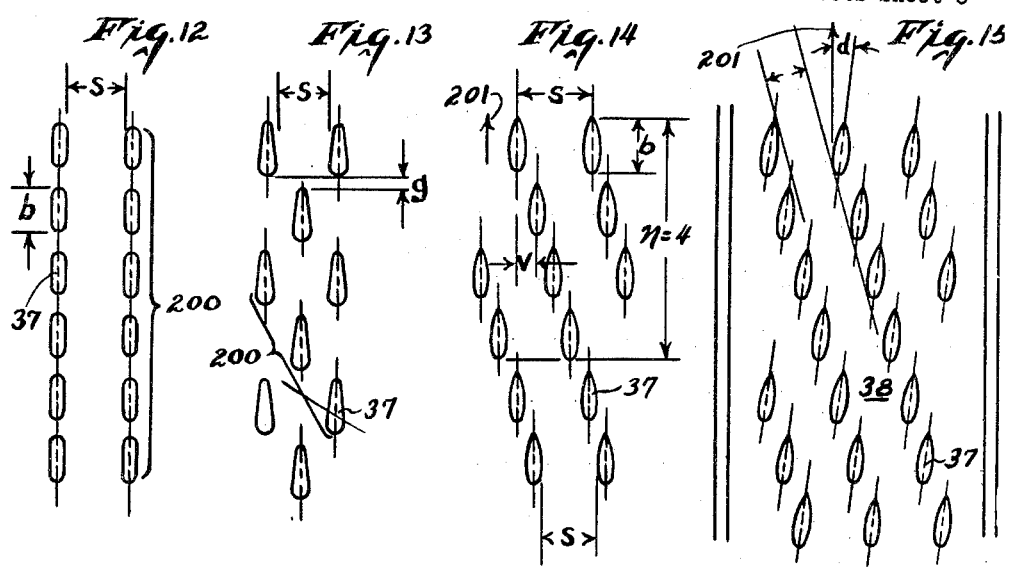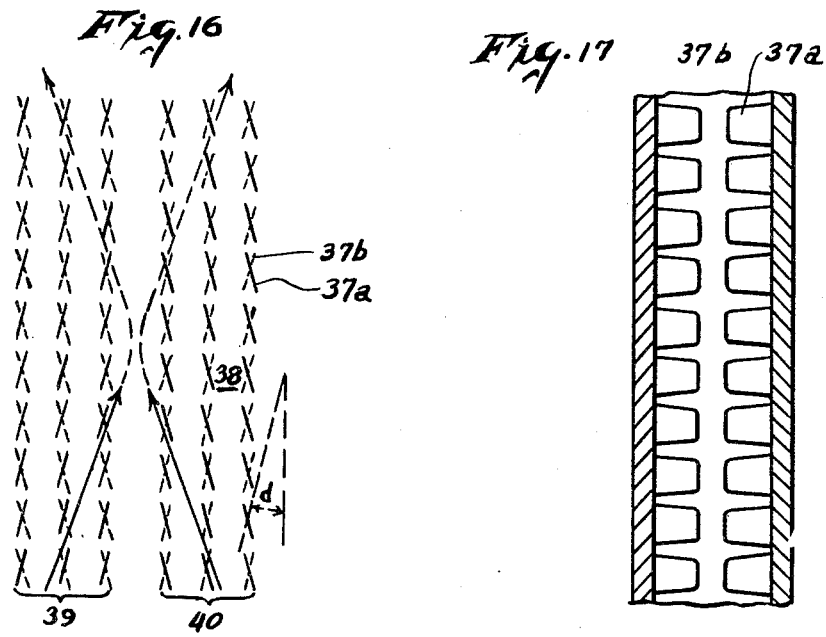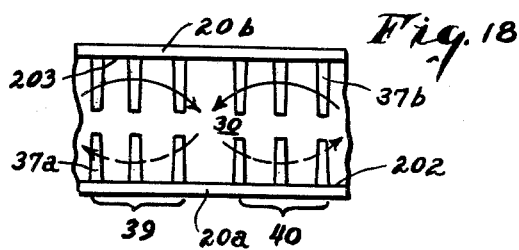

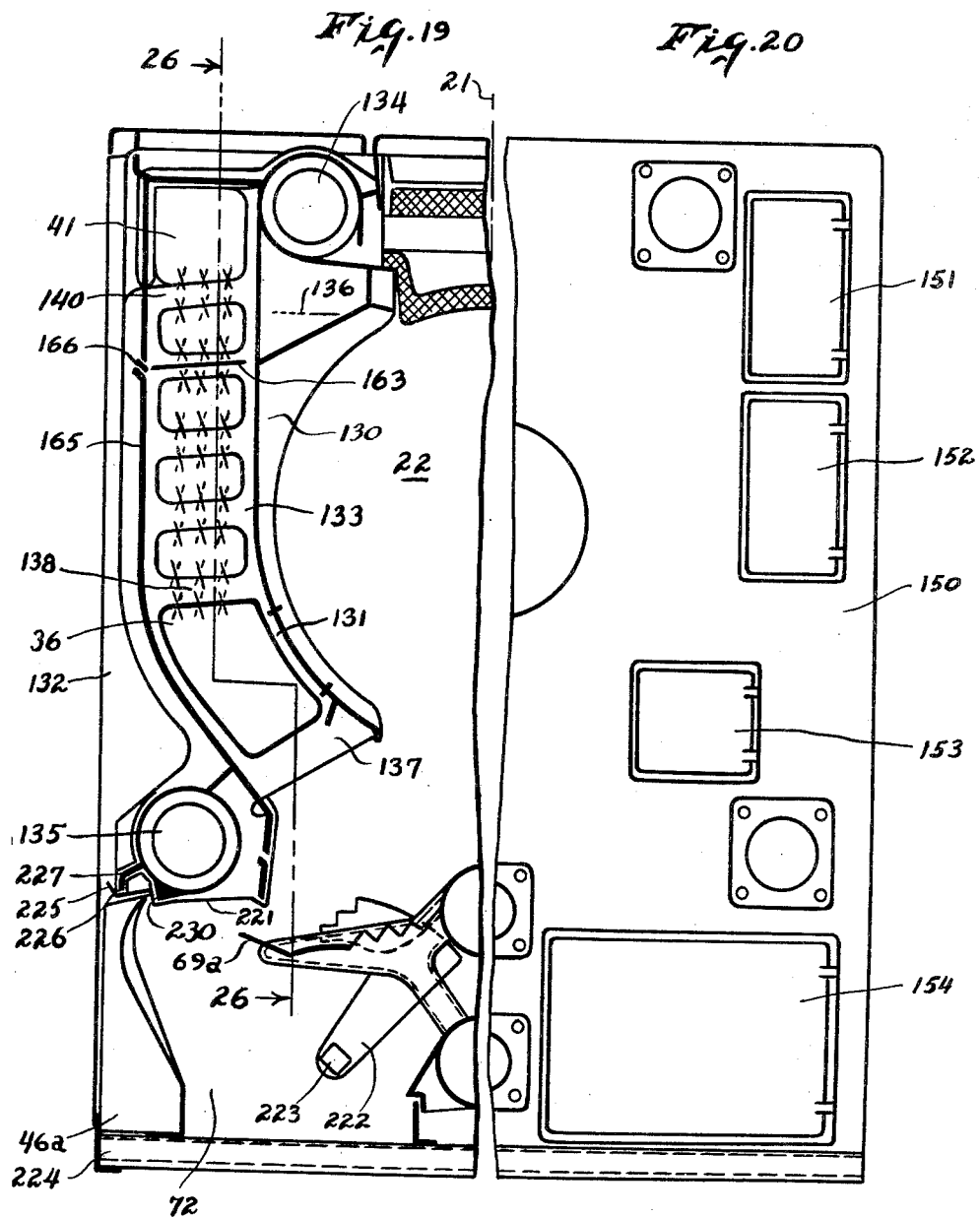

Dec. 25, 1962 G. GÖBEL 3,070,076
HEATING BOILER
Filed Dec. 4, 1959 13 Sheets-Sheet 11
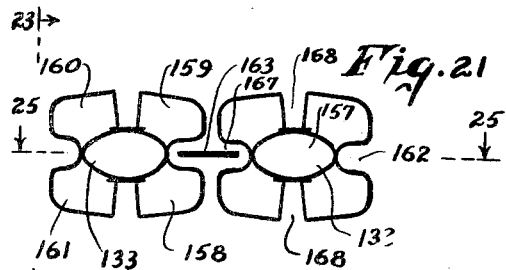
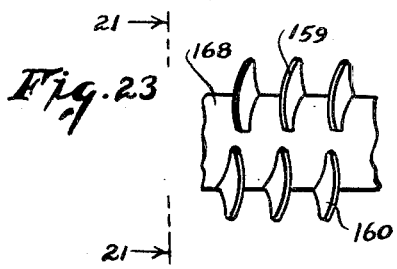
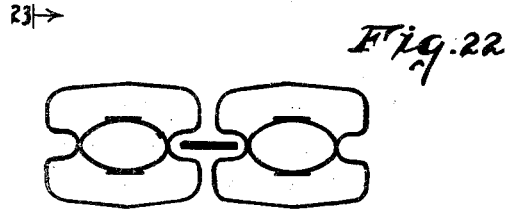
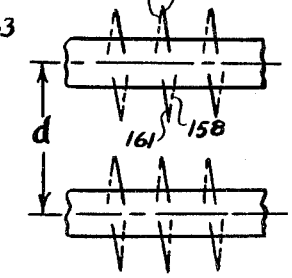
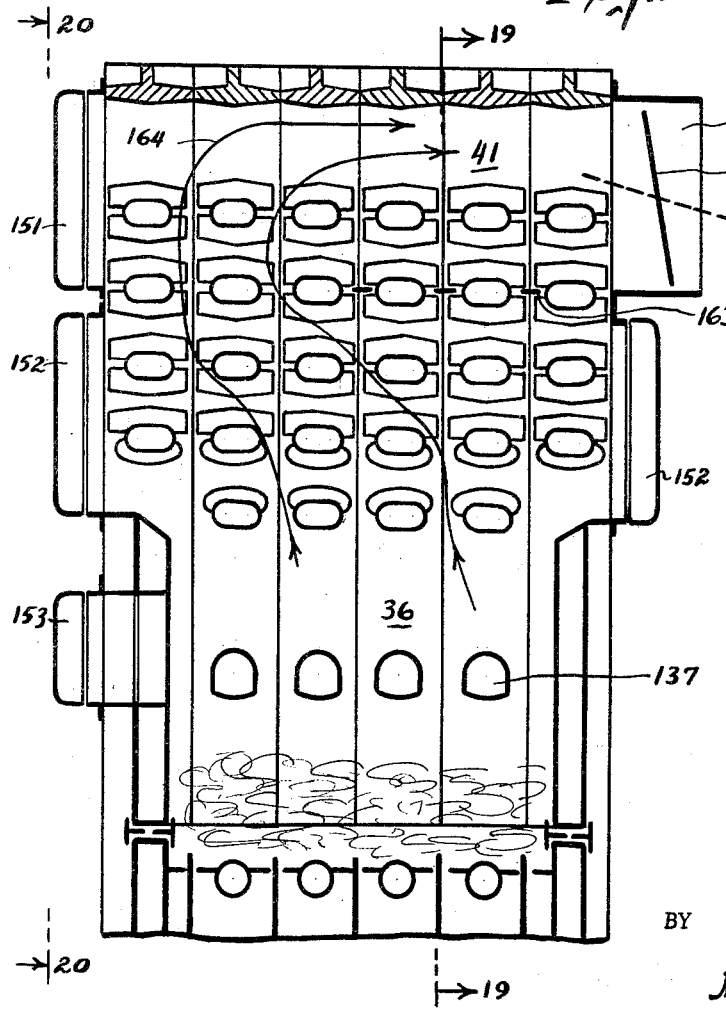
INVENTOR:
GERHARD GÖBEL
BY
Mestern, Ross & Mestern Dec. 25, 1962  G. GÖBEL  3,070,076
HEATING BOILER
Filed Dec. 4, 1959  13 Sheets-Sheet 12

INVENTOR:
GERHARD GÖBEL
BY
Mestern, Ross & Mestern

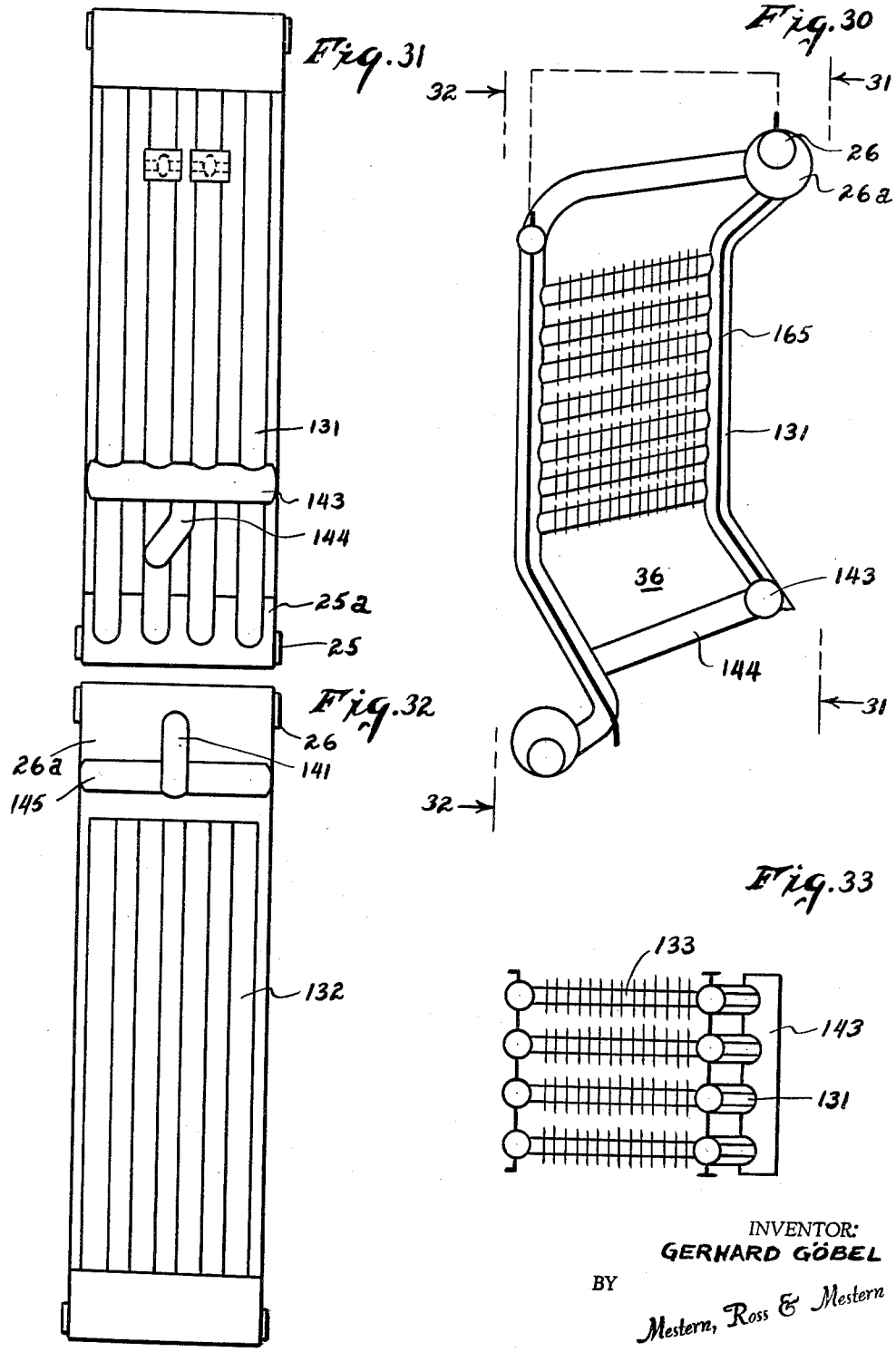

United States Patent Office 3,070,076
Patented Dec. 25, 1962

3,070,076
HEATING BOILER
Gerhard Göbel, Giessen, Germany, assignor to
Buderus'sche Eisenwerke, Wetzlar, Germany
Filed Dec. 4, 1959, Ser. No. 857,292
Claims priority, application Germany Feb. 28, 1959
6 Claims. (Cl. 122—228)

The invention relates to a boiler for producing hot liquids or steam, and in particular to such a boiler having two halves symmetrical with respect to the median plane, risers between serial heating surfaces in each boiler half on either side of a central chamber, and smoke ducts above and fire chambers beneath the risers.

In a known central-heating boiler, the smoke duct over the risers in each boiler half is no wider in transverse direction than the risers themselves. The risers are fire tubes standing vertically in a water tank. In the tubes there are baffles to improve heat transfer by turbulence. The water tank is very wide, making the boiler very wide also, and the central chamber, serving as a coke bin, relatively narrower. Disadvantages are that the bin is of small capacity and open at the top.

There are also known three-header boilers having several horizontal passages at the top, wherein some of the heat is given off by means of fins to the water surrounding the passages. The common top header then occupies the longitudinal centerline of the boiler above, rendering it inaccessible from the top, so that it can only be used as an oil-fired or top-combustion boiler.

There are other known boilers in which discending ducts adjoin the ascending ducts, so that the flue gases have to be exhausted at the bottom. Such boilers are very wide, and nevertheless have small bin capacity.

In the known boilers, the central chamber or charge shaft is formed by substantially vertical parallel walls of the boiler elements, which results in much waste space.

The object of the invention is to provide a boiler having the following characteristics:

Extremely high heat exchange for given total bulk;
Extremely small bulk for given total heat exchange;
Low flue gas temperature in smoke duct;
Ascending ducts only, no discending ones;
Complete utilization of boiler space for combustion, heat exchange, fuel bin, stoking, ash and slag removal, and combustion-gas flow (no dead space);
Complete utilization of boiler width when firing solid fuels;
Low over-all height;
In the case of solid fuels, possibility of secondary-air feed without blowers, with complete combustion of carbon monoxide in comparatively small fire space;
Cast-iron or steel construction of boiler elements;
Interchangeable use of like boiler elements for firing with solid and liquid fuels, as for example coke, coal or oil, with no disadvantages relative to a special boiler for a given fuel;
Low depth of solid-fuel bed on the grate;
Convenience in charging solid fuels;
Simple provision for breaking up slag;
Convenience in cleaning risers;
Possibility of heat expansion without elaborate devices;
Ease of conversion to different fuel, for example coke to oil or coal and vice versa;
Possibility of supplying boiler without grate, to be supplemented at will by purchaser.

The essential parts of the boiler are in particular to be such as to constitute a valuable commodity, and be assembled by the user to provide a boiler suitable for firing with coke, coal or oil as desired.

According to the invention, the boiler comprises two halves symmetrical with respect to its median vertical plane, having risers between heating surfaces on either side of a central chamber, and smoke ducts above and fire chambers beneath the risers, wherein the novel features consist in that the risers are narrow and lie between highly active heating surfaces; a wide fire chamber is provided in each half of the boiler; the central chamber has a roughly circular cross-section; and underneath the central chamber and fire chamber, a low space occupying the entire width of the boiler is provided.

The lower or bottom space is able to accommodate a low-pitched coke grate, a low stoker grate for coal, a shielded circulation chamber insulated underneath, a heat exchanger or the like.

The device according to the invention will now be more fully described with reference to the accompanying drawing, but it should be understood that the same is given by way of illustration and not of limitation and that many changes in the details may be made without departing from the spirit of the invention.

In the drawing:

FIG. 8 shows a schematic longitudinal section of a coke boiler;

FIG. 9 shows a schematic longitudinal section of an oil-fired boiler, the section being passed through the risers and the central chamber, and the partial section of the central chamber being swung about a dot-dash line in the plane of the drawing;

FIG. 10 shows a schematic cross-section of two lower water arms, viewed from the center of boiler towards the bottom header;

FIG. 11 shows a section, similar to FIG. 10, of a water arm with secondary-air trough;

FIG. 12 shows a view of part of a heating surface viewed from within a riser, with short fins arrayed in lines;

FIG. 13 shows a view similar to FIG. 12, with a different fin arrangement;

FIGS. 14 and 15 show other variants of the fin arrangements in FIGS. 12 and 13;

FIG. 16 shows a simplified view, drawn to a smaller scale, of two neighboring arrays of fins in a riser;

FIG. 17 shows a vertical section of the array in FIG 16;

FIG. 18 shows a horizontal section of the array in FIG. 16;

FIG. 19 shows a section, similar to FIG. 1, at the plane XIX—XIX in FIG. 26, of a boiler half with modified boiler element and grate;

FIG. 20 shows a front view of the boiler of FIG. 19, viewed in the direction of arrow XX in FIG. 26;

FIG. 21 shows a cross section of two neighboring transverse or branch tubes of neighboring elements, viewed in the direction of arrow XXI in FIG. 23;

FIG. 22 shows a section, similar to FIG. 21, of modified branch tubes;

FIG. 23 shows a view of the transverse tubes of FIG. 21 in the direction of arrow XXV;

FIG. 24 shows a view, similar to FIG. 23, of the tubes of FIG. 22;

FIG. 25 shows a view of the tube of FIG. 21 or 22 in the direction of the arrow XXIII;

FIG. 26 shows a longitudinal section in the plane XXVI—XXVI in FIG. 19;

FIG. 30 shows an elevation of a special steel banked boiler element;

FIGS. 31 and 32 show views of the bank of FIG. 30 in the direction of the arrows XXXI and XXXIII respectively; and FIG. 33 shows a simplified cross-section of the bank of FIG. 30, approximately parallel to the transverse tubes, as seen from above.

Figure 1:
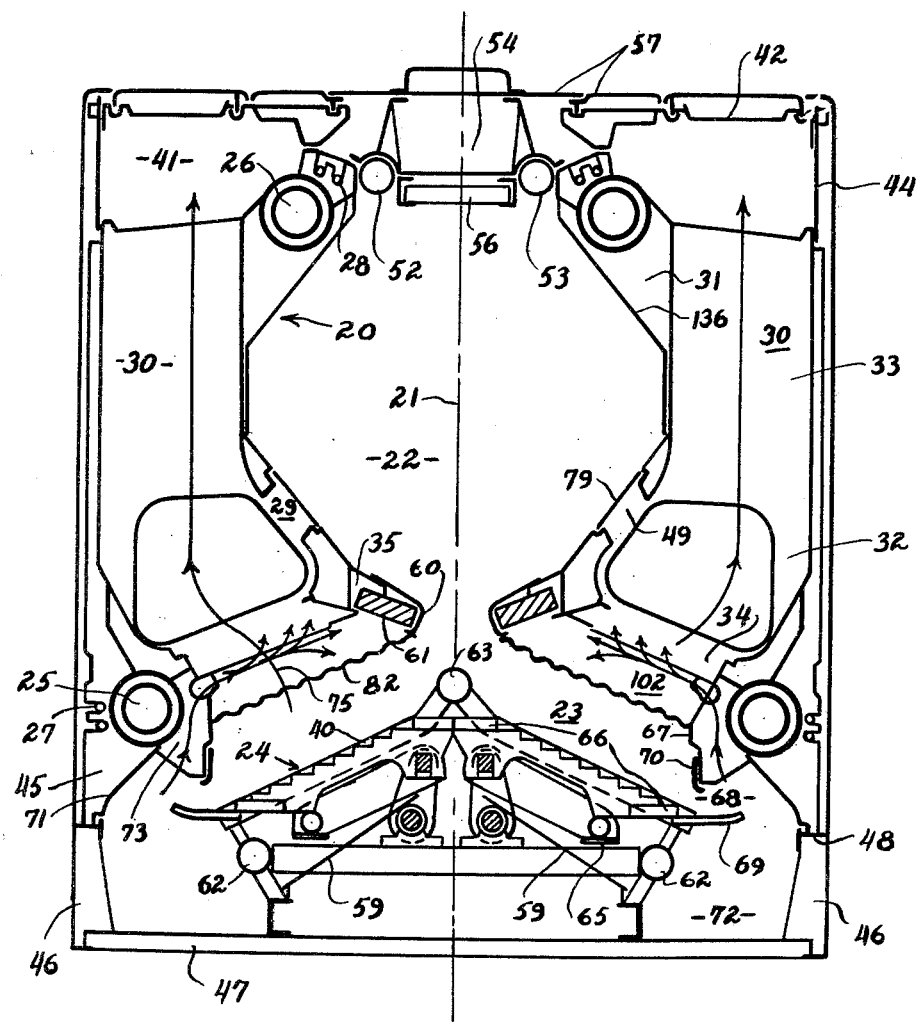
FIG. 1 shows a simplified sectional view of a coke boiler at the plane I—I in FIG. 2.
Figure 2:
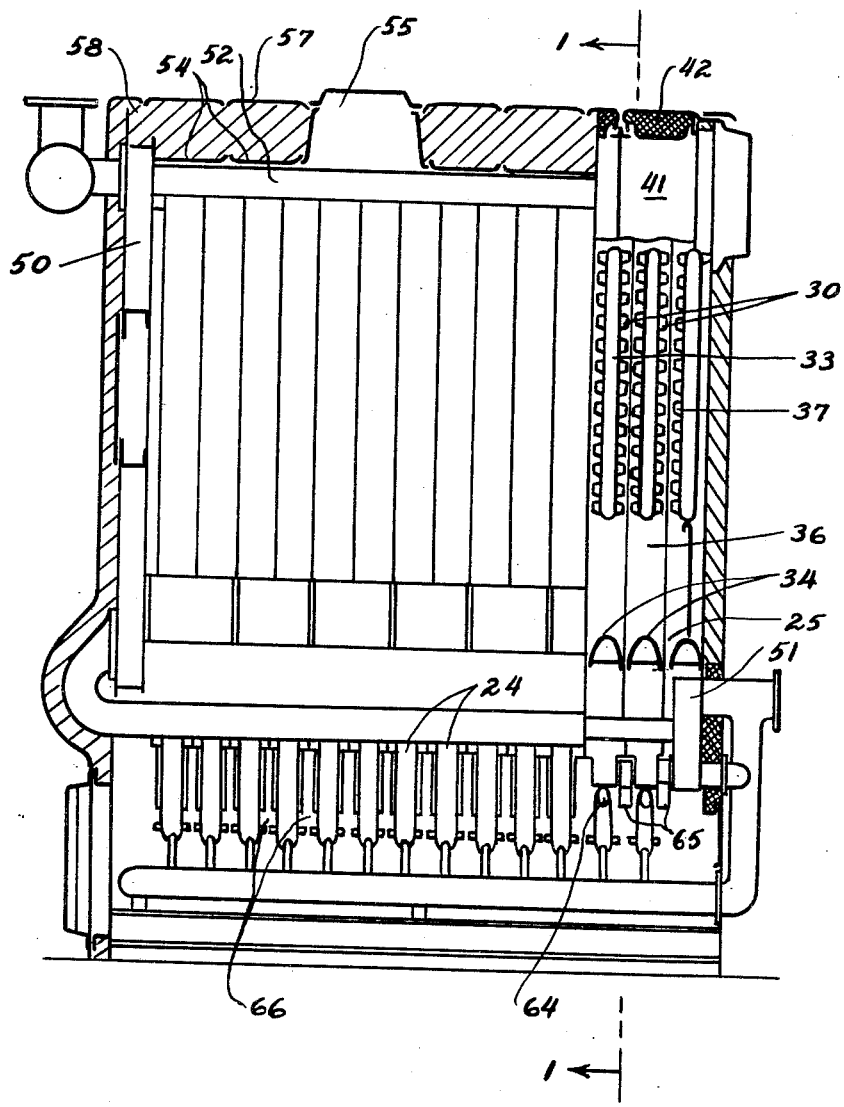
FIG. 2 shows a longitudinal section of the boiler of FIG. 1, with serial heating surfaces in partial section.

The coke-fired boiler of FIGS. 1 and 2 for producing hot water or steam has substantially vertical elements 20 on the left and right, symmetrical with respect to the median plane 21 and leaving an open space 22 between them. These boiler elements are preferably made of cast iron.

Beneath elements 20 and central chamber 22 there is a low, broad chamber 23 accommodating a wide, flat, peaked or saddle-type grate 24.

The several boiler elements are connected with each other through nipples at the top and bottom headers 26, 25 and held together by tension rods 27, 28. The generally cylindrical central chamber serves as a coke bin, and has a roughly circular cross-section bounded by an inner sharply inclined water arm 29 which is part of element 20, the inner boundary of riser 30, and an upper communicating arm 31 to the top header 26. The bottom header 25 is in the immediate vicinity of the exterior or outer wall of the boiler. From it leads firstly a water arm 32 in substantially vertical upward direction into the water pocket 33 of riser 30, and secondly a lower water arm 34 sloping more gradually inward into arm 29 through a bend 35. Arms 32, 34, 29 and riser 30 enclose a fire chamber 36.

The heating surfaces on the outer walls of water pocket 33 are set with numerous short fins 37 (FIGS. 12–18) projecting into the risers 30 formed by adjacent elements 20 to provide a highly active heating surface with very high heat transfer per unit area.

Short fins are here understood to be fins so fastened and arranged that each fin is definitely in the line of thermal and aerodynamic attack, and not appreciably within the wake or temperature shadow of the preceding fin. This is achieved by a definite regular relationship between fin depth (length in flow direction), spacing (distance between neighboring fins, measured transversely to flow direction), and stagger. Favorable conditions result especially from observance of the formula $$\frac{0.16}{n^2} > \frac{b}{sRe} > 10^{-4}$$

where $b$=fin chord, $s$=spacing, $n$=number of fins in line per unit spacing (in the case of oblique stagger, $n$ is the number of fins in, divided by the number of spacing units transverse to the main flow occupied by, a line of fins), and $Re$=Reynolds number.

These quantities are illustrated in FIGS. 12–15. According to FIG. 14, $$n=\frac{s}{v}=4$$

The fin chord $b$ is smaller than 100 mm. and preferably smaller than 40 mm.

The simplest form of fin array is shown in FIG. 12. The fins in FIGS. 12–18 are so arranged in lines 200 that the spaces between the lines may serve as vertical clean out passages 38.

In the case of a sidewise stagger of fins 37 with respect to the main flow direction 201, as in FIGS. 13–15, the distance $g$ can be made very small without aerothermic interference between the fins of a line 200.

It is especially advantageous for the fins, as in FIGS. 15–18, to be set at a small angle of pitch $\alpha$ with respect to the main flow direction 201. Then, several neighboring lines 200 are associated in a group 39 of fins oriented alike, while neighboring groups, for example 39 and 40, contain fins with equal but opposite pitch angles.

The fins 37a and 37b, located in the same riser 30, of opposite heating surfaces 202 and 203 of neighboring boiled elements 20a and 20b have equal but opposite angles of pitch, so that the flue gases, after pasing obliquely between one group, for example 39, of one heating surface, for example 202, and there encountering the stream from the neighboring group 40 of the same heating surface, escape into the passages of the opposite heating surface 203 and proceed so as to intersect their original flow direction at about twice the pitch angle. In neighboring groups of fins of opposite heating surfaces in a riser, therefore, the gases execute a swirling motion. The result is a further intensification of heat transfer. The possibility of conveniently cleaning the passages 38 is wholly retained. This situation is illustrated in FIGS. 16–18.

Above all the risers 30 of one half of the boiler, and partly above and beside the top header 26, there is a wide, continuous smoke duct 41. It may be bounded above and at the sides by uncooled plates 42 and 44.

The fire chamber 36 and the smoke duct 41 are here wider than the riser 30.

Beneath the bottom header 25, element 20 has a foot 45 by which it rests on pedestal 46 of base 47. At the two ends, the front and rear water pockets 50, 51, connected above by pipes 52, are also attached to pedestal 46. The bearing surface 48 of foot 46, not required to transmit any flexure, is so small as to constitute a pivot. Resting on surface 48, elements 20 lean, freely swingable, against a top abutment 53, so that they are free to expand.

The central space or bin 22 is closed off at the top between pipes 52 by a cover 54, and provided with charge apertures 55. To protect this uncooled superstructure from heat radiation, a tile 56 is suspended in place. The plates 42 over ducts 41 are readily removable for cleaning and consist of two thicknesses with insulation between. The risers, after removal of covers 42, can be cleaned with single or multiple brushes or soot blowers. The soot thus removed will drop on the grate and into the ash pit, eliminating the need for special clean-out apertures for soot removal. The remaining parts of the top of the boiler are covered over by plates 57 with insulation 58 beneath.

At the bend 35, there are shelves 60 to control the fuel bed, and the bricks 61 underneath them serve to protect the shelves 60 and promote ignition of the fuel. The angle of inclination of the communicating arm 31 and the water arm 29 is about equal to the angle of repose of the fuel, so that the bin 22 can be completely filled and completely emptied.

The low peaked grate 24 has two return manifolds 62 below and a forward manifold 63 above, connected by grate tubes 64 between which there are movable grate bars 65 with enlarged pushers 66 at the exit end. The fuel is conveyed outward throughout the breadth of the grate by the powered grate bars 65, which extend over the entire width, so that the angle of the fuel bed 82 can be kept smaller than the natural angle of repose. The fuel bed is banked up by a wall 67. The slag is pushed out through a gap 68 between a fire grate 69 and a slag guard 70, loosely suspended from the boiler elements, by the pushers 66. Large cakes of slag will strike an oblique web 71 on the element, break off, and drop into the slag pit 72. The ashes falling through the grate slide down chutes 59 into pit 72, whence slag and ash can be removed. Underneath chutes 59 is an air space to which combustion air is supplied from the ends of the boiler.

This design and arrangement of the grate increases its effective width and reduces the height of the fuel bed.

The bottom header 25 is about at the level of wall 67. Between wall 67 and header 25, secondary-air passages 73 are provided. They terminate in secondary-air nozzles 74 just below the bottom water arm 34, so that the secondary air in its vicinity can be projected well into the combustion chamber, approximately along the arrows 75, without any auxiliary blower.

FIG. 10 shows a simplified vertical section of two water arms 34, seen from the center of the boiler. The side walls of each arm 34 are prolonged below by flanges 76, forming a channel 77 whence the secondary air cannot rise immediately after leaving nozzle 74. Rather, it is carried along arms 34 and only gradually overflows the flanges 76 along the way, mixing meanwhile with the combustion gases (arrows 78) containing carbon monoxide.

In the variant of FIG. 11, a trough 80 of metal or refractory material is placed between flanges 76, converting channel 77 into a closed passage, provided with several air nozzles 81 opening downward. Then the secondary air can be accurately apportioned to the several zones of the grate and ejected directly upon the fuel bed 82 resulting in especially thorough turbulence and more prolonged mixing, and hence shorter combustion time; besides, the secondary air envelopes the arms 34 in such a way that the combustion gases cannot be suddenly cooled by the cold arms.

In the coke boiler, FIG. 1, the passages 49 between water arms 29 are covered by removable plates 79 so that the combustion gases will not follow this route.

Figure 3:
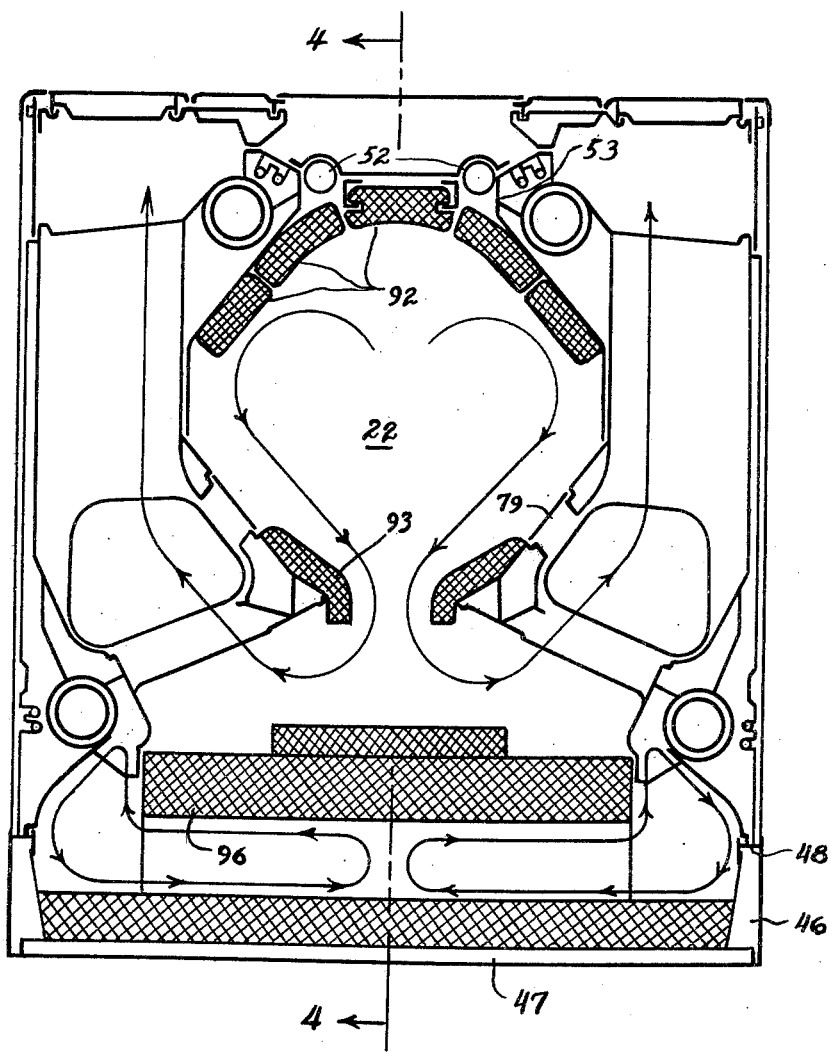
FIG. 3 shows a section, similar to FIG. 1, of an oil-fired boiler without grate.
Figure 4:
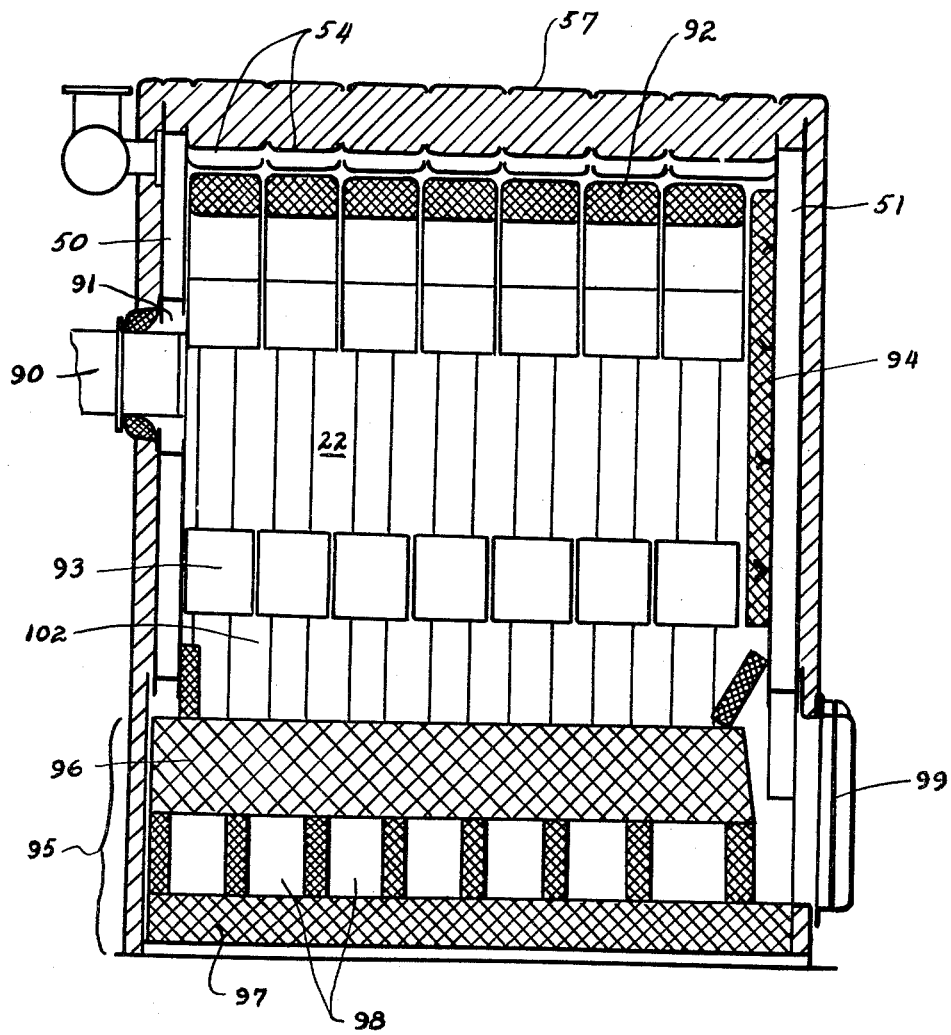
FIG. 4 shows a section at the plan IV—IV in FIG. 3.

The oil-fired boiler in FIGS. 3 and 4 is of substantially the same construction as the coke boiler. Of course, there is no grate. The central chamber 22 forms the combustion chamber for an oil burner 90, mounted in the burner opening 91 of the front water pocket 50. To protect the roof and the top of the elements, particularly in steam boilers, a refractory vaulting 92 is provided. The similarly exposed bends 35 are also provided with liners 93 instead of the shelves 60. Finally, the rear water pocket 51 is protected by a liner 94, and the boiler floor by a refractory structure 95. For heat insulation of the foundation 47, an interrupted layer 98 is laid between a top layer 96 and base insulation 97, accommodating air circulation to convey heat to the lower parts of the elements, as indicated by arrows. A door 99 on what serves as a combustionair port in coke boilers becomes an explosion vent in the oil-fired boiler.

Figure 5:
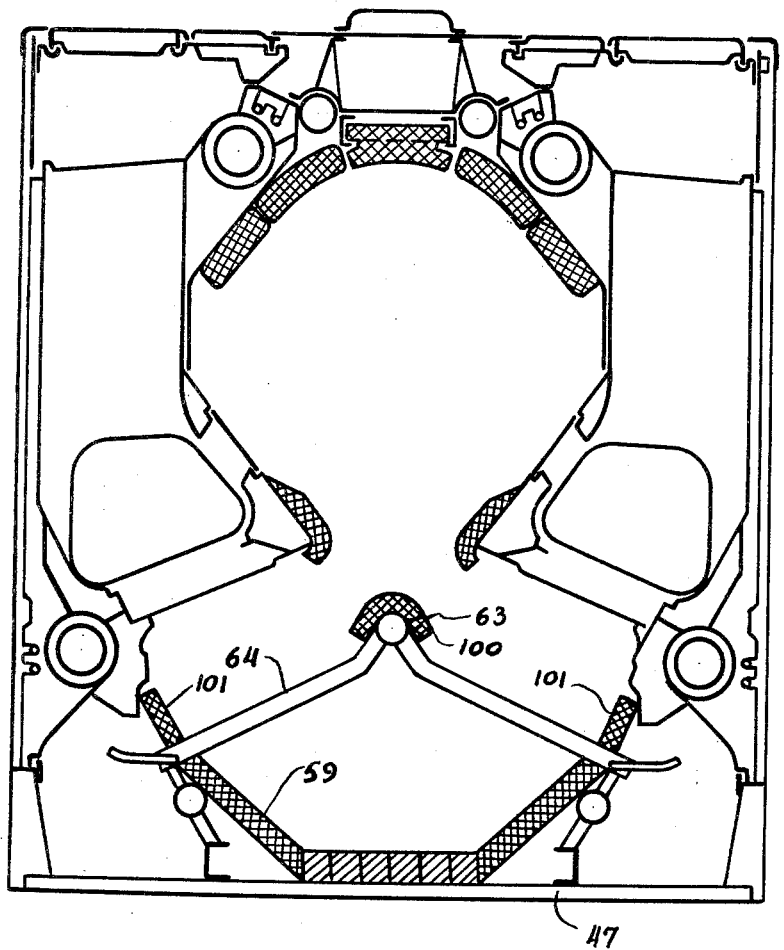
FIG. 5 shows a transverse section of a modified form of oil-fired boiler, with grate.

Alternatively, as in FIG. 5, the oil-fired boiler may have a grate in which the pushers and their actuating mechanism are omitted. Only the top manifold 63 of the grate and the gaps at its open ends are covered with insulation 100 and 101. Then the underside of the grate tubes may also be exposed to combustion gases. The ash troughs 59 form radiation protection for the base 47.

The simplified diagrams in FIGS. 8 and 9 show the directions of flow in the coke- and oil-fired boilers previously described. In the coke boiler of FIG. 8, combustion air enters the boiler underneath the grate. After overcoming the main resistance of the grate and the fuel bed 82, the combustion gases enter the fire space 102 over the fuel bed and continue through the passages 103 between water arms 34 into fire chamber 36. Thence they continue upward through risers 30 into the horizontal smoke ducts 41. In order to heat the several risers uniformly, some or many of the pasages 103 may be covered over on the combustion-gas-exhaust side with plates 104.

In the section of FIG. 9, to make the diagram clearer, the oil-combustion chamber and part of the fire space 102 are drawn as swung downwardly. The flame is projected from oil burner 90 into the combustion chamber 22, whence it passes to either side into the fire space 102.

Since in the rear half of the boiler the passages 103 are closed by plates 104, the combustion gases are deflected, passing through apertures 103 into fire space 36 through the front half only. Then they are distributed evenly among the risers and flow up through them into the smoke ducts 41 at the top. The space used as a coke bin in the coke boiler is here utilized as an additional high-grade heating surface. It has been found that the boiler can be operated at rather higher load as an oil-fired boiler than as a coke boiler.

Figure 6:
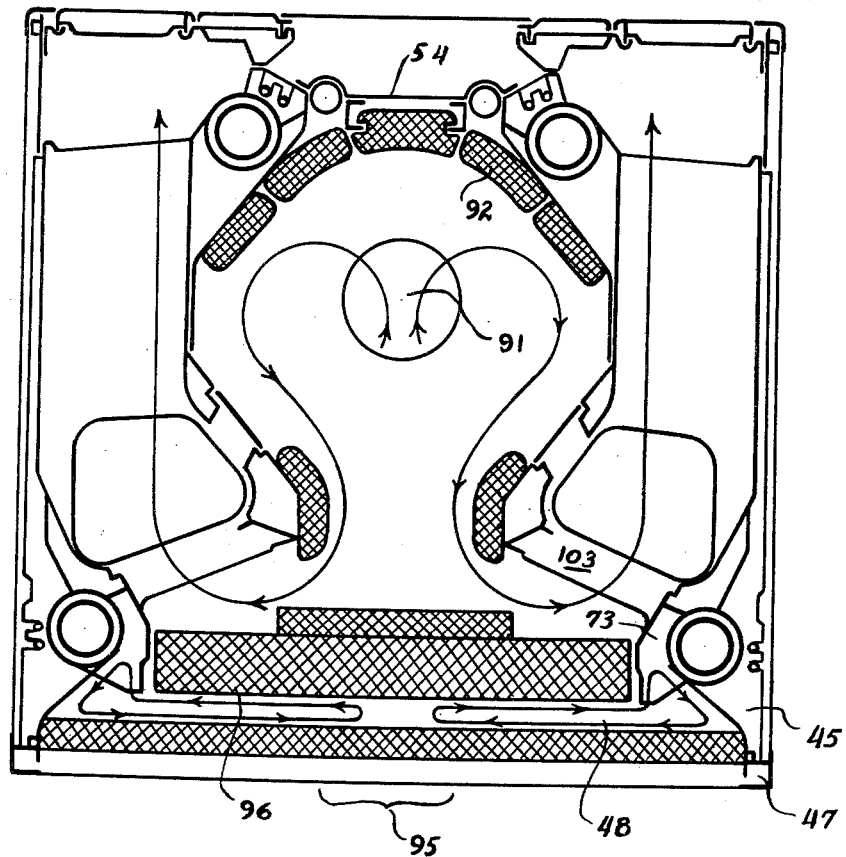
FIG. 6 shows a transverse section of another modified form of oil-fired boiler.

This boiler becomes especially economical when the feet 45 are set directly on the base 47, as shown in FIG. 6. Whereas in the boilers thus far described conversion from oil to coke operation and vice versa is possible, at least by installation and removal of a grate, an ordinary coke grate cannot be installed in the boiler of FIG. 6. In principle, however, this boiler functions in the same way as that of FIGS. 3 and 4.

Figure 7:
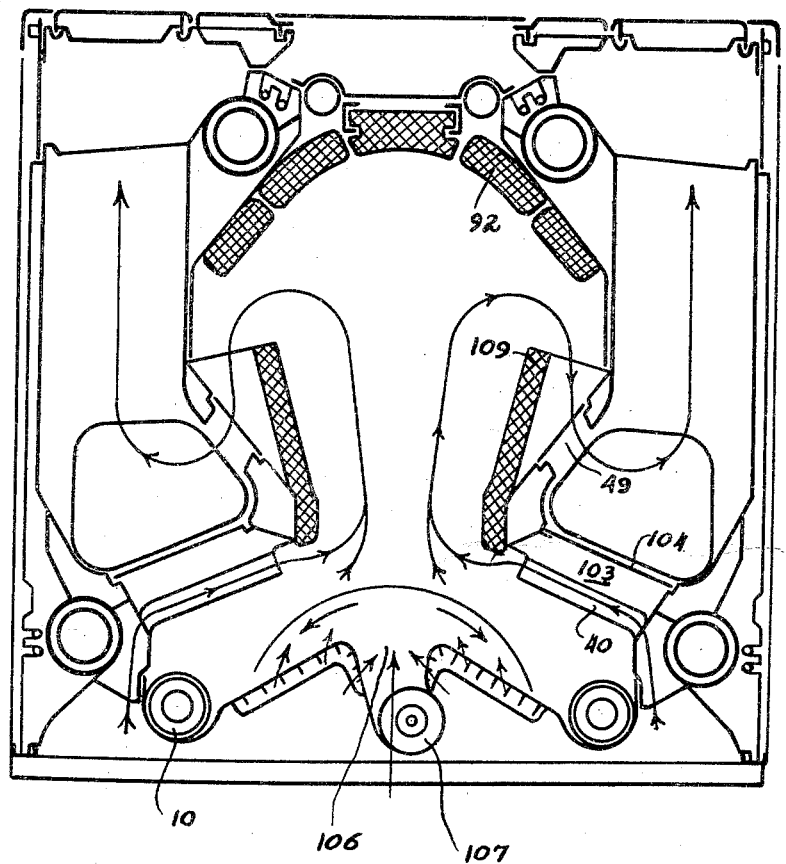
FIG. 7 shows a transverse section of a coal-fired boiler.

However, the boiler of FIG. 6 is readily converted for solid fuels by installing a coal stoker 106. Such a coal-fired boiler is shown in FIG. 7. Instead of the bottom insulation, underneath the two banks of elements there is a coal stoker 106 with feed screw 107 and two lateral slag screws 108. The openings or gaps 103 between the lower water arms 34 are closed off by covers 104, while the gaps or openings 49 between the inner water arms 29 are preferably left open in the front part of the boiler. The flames rise from the stoker into the bin space, the top of which has a lining 92 much as in the case of oil-fired boilers. To prolong the path of the flames extending between water arms 29 into the fire spaces, baffles 109 project from bend 35 in front of the passages between water arms 29. These baffles 109 at the same time protect the exposed bends 35. The secondary air is directed laterally through prolonged pockets under the arms 34 of the elements.

FIGS. 19–26 show another embodiment of the boiler according to the invention, in the form of a combined ascending and horizontal boiler. Here the tubes may conveniently be cleaned from in front. Besides, this boiler permits control of the gas flow at will, with consequent uniform heat transfer and full utilization of pressure drop.

Instead of the large water pocket of the embodiments previously described, we here have a tube bank, consisting of elements 130 in the case of cast boilers, each resembling a ladder. Such as cast element 130 consists of two substantially vertical manifolds 131 and 132, corresponding to the uprights of a ladder, and several substantially parallel and horizontal transverse tubes 133 connecting the manifolds 131, 132 as the uprights of a ladder are connected by the rungs.

At the top, the inner manifolds 131 are connected to an internal header 134, and at the bottom, the outer manifolds 132 are connected to an external header 135, where the headers of adjacent elements again form the cold-water and hot-water or steam passage. In FIG. 19, 136 designates the water level.

The vertical distance between the first-lowermost-transverse tube 137 and the second transverse tube 138 in each element is greater than that between the next transverse tubes. Between tubes 137 and 138 lies the fire space 36. Above the uppermost tube 140 lies the smoke duct 41.

FIG. 20 shows one boiler half in outside view. The end member 150 contains openings rendering the ducts, fire space, and ash and slag space accessible for cleaning or emptying. The openings are closed by hinged doors 151, 152, 153 and 154. The rear end member has, instead of the door 151, a smoke pipe 155 with damper 156.

As the section (FIG. 21) through the rung tubes 133 shows, these are oval in shape, with longest diameter 157 horizontal. The short fins are arranged in rings of four, 158 to 161, in the manner of a four-leaf clover. In horizontal direction, the fins project beyond the tube to which they belong, the top fins 159, 160 being separated from the bottom fins 158, 161 by gaps 162. This preserves their properties as short fins.

In the gaps 162, guide plates or sheets 163 may be inserted, and by suitably distributing these, the gas flow in the boiler can be controlled as desired, say as indicated in FIG. 26 by flow arrows 164. The considerable portion of pressure drop formerly lost in the top smoke duct can now be utilized for heat transfer. By arranging the plates 163 as in FIG. 26, in particular, full utilization of the front part of the boiler is made possible.

To permit later insertion of plates 163, the outer retaining webs 165 may be provided with closable openings 166. The control plates 163 should preferably be of such width as not quite to occupy the space between neighboring tubes 133 in gaps 162. Rather, a small slot 167 should be left on each side, through which combustion gases can pass in the boundary layer to improve heat transfer. Soot particles brushed out upon cleaning can also drop through.

In the arrangement of FIGS. 21 and 23, the top fins 159, 160 of a tube 133 are separated by a vertical slit or gap 168. Alternatively, however, as FIGS. 22 and 24 show, they may be continuous at least on their outer edges. In both cases, the fins are preferably set oblique, as schematically shown in FIG. 25, so that their planes do not coincide but intersect, as results from unlike angles of pitch of the fins on either side of the tube. The same applies to the bottom fins 158, 161. Thus in horizontal direction the fins are somewhat staggered, and the gas flow is generally swirled. In vertical direction, the distance $d$ between adjoining tubes is so large that a continuous cleaning means such as a brush can be passed between the tubes throughout the length of the boiler. Owing to the flattened cross-section of tubes 133, the bristles of a brush can reach the entire space between tubes of neighboring elements without getting stuck between the tubes of an element.

The short fin surface is again of about the same area as in the boiler first described. However, the subdivision into rung tubes prevents establishment of boundary flow, thus improving heat transfer.

Figure 27:
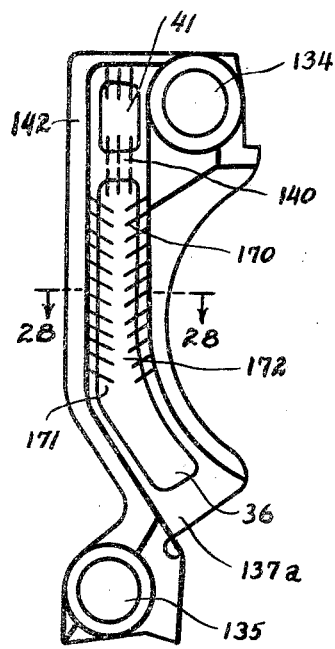
FIG. 27 shows an elevation of an element of a small boiler.
Figure 28:
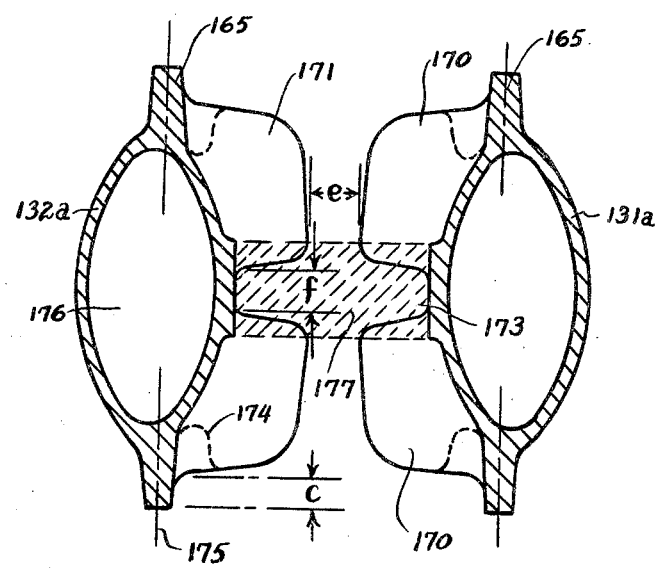
FIG. 28 shows a section in the plane XXVIII—XXVIII of FIG. 27, drawn to an enlarged scale.

The boiler element of FIG. 27 is intended for a boiler of smaller capacity. Owing to the smaller distance between the risers 131a and 132a (FIG. 28), transverse tubes are not necessarily required. Transverse tubes 140a and 137a are provided at the top and bottom only.

From tubes 131a and 132a, short fins 170 and 171 respectively project obliquely downward into the riser 172, the lower part of which becomes a fire space because no fins are present. The passage 41 may alternatively be surrounded above by a larger transverse tube 142. This is also possible in the elements of FIGS. 19 and 29.

Since the combustion gases around fins 170, 171 have a considerable vertical flow component, larger distances $c$, $e$, $f$ must be provided in horizontal direction between the fins of a tube in a gap 173 ($f$), between the fins of neighboring tubes ($c$), and between the fins of opposing tubes ($e$). The flow can be improved by leaving a gap 174 between the fins and the webs 165, as shown dotted in FIG. 28. Here, as in the case of the tubes of FIG. 21, special insert cores 177 are required in casting the elements.

The center 175 of the web 165 is preferably offset from the center 176 of tube 131a or 132a in the direction of the riser, so that the bristles of a cleaning brush will not encounter any sharp fillets.

Figure 29:
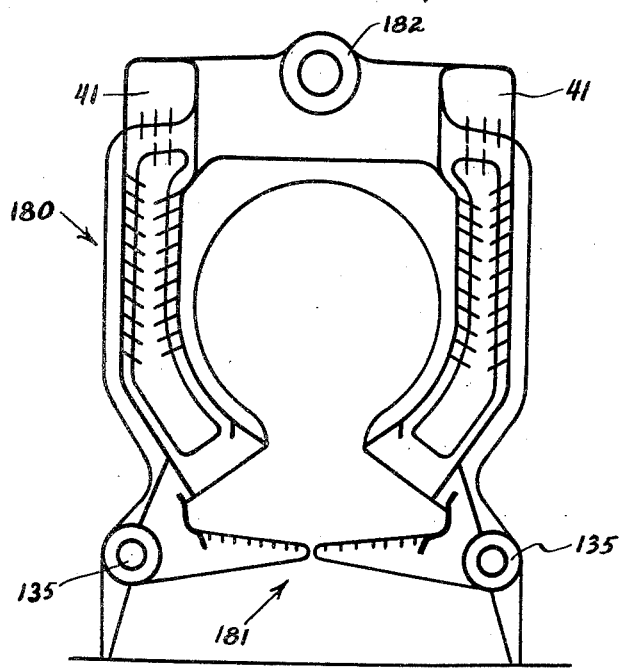
FIG. 29 shows an elevation of an element of a three-header boiler.

FIG. 29 shows an element 180 of a small three-header boiler, not composed of two halves as in the other embodiments, but made in one piece. It at the same time includes the grate 181. Only one top header 182 is provided.

A plurality of elements may be preassembled in blocks at the factory, and then assembled to form the boiler at the point of installation. In preassembly, each block is bound together with its own pair of tension rods. In the boiler assembly, pairs of neighboring blocks will be combined by means of two additional short tension rods. For this purpose, the elements are provided with double eyes near their headers. Such eyes receive tension rods 27 and 28 in FIG. 1.

It is expedient to prefabricate blocks of three and four elements, since these will serve to make up any number of elements excepting the numbers 1, 2 and 5.

Steel boilers may conveniently be assembled in such blocks by welding.

FIGS. 31–33, for example, show such a welded block of steel elements. In this case the block consists of four outer and inner risers 132, 131, joined by finned transverse tubes 133. The bend 35 (FIG. 1) is formed by an extra header 143 to which the tubes 131 are connected. This header 143 is connected by only one tube 144 to one of the four outer risers 132, the tops of which open into an extra top header 145. The sets of tubes 131 and 132 each open into a top and a bottom header 26a, 25a with bosses 26, 25. Bosses of neighboring headers are connected by means of nipples, flanges or the like. Extra header 145 is connected by a single transverse tube 141 to header 26a. Between risers 131, 132, webs 165a are welded.

The grate 220 in FIG. 19 differs from the grate in FIG. 1 in that the projecting portion 69a rises obliquely upward, while the under surface 221 of the element is substantially straight. The burnt slag is pushed obliquely upward on part 69a, obliquely strikes the under surface 221, and break off. The pusher 222 executes a rotation about the shaft 223.

The pedestal 46a is of cast iron and bolted to the base at 224. The bearing surface 48a rises gently towards the center of the boiler and carries a Z-shaped bracket 225 one flange of which engages the edge of pedestal 46a. The other flange 226, together with a web 227, forms a sort of knife-edge support for the element. A lug 230 on the foot of the element rests against the edge of the pedestal, with member 225 interposed. This form of foot provides a satisfactory pivot joint. Since the center of gravity of the element lies towards the center of the boiler from this pivot, the elements can be held in any position by means of tie-bolts or the like from the outside. The approximately horizontal disposition of the underside of the foot also renders it practicable to deposit the element on a horizontal surface.

What I claim is:

1. A boiler comprising a pair of horizontally spaced members substantially symmetrical about a vertical plane, said members being divided into generally tubular sections and having substantially straight vertical outer wall surfaces and facing inner wall surfaces which approach each other at an upper and a lower level and recede from each other at a narrow waist between said levels, thereby forming a generally cylindrical, horizontally extending central chamber between them, said sections being bounded between said outer and inner wall surfaces by thermally conductive vertical partitions lying in planes transverse to the major dimension of said central chamber, the partitions of adjacent sections being spaced from each other and forming risers for ascending hot flue gases, the interior of said sections constituting compartments in heat-exchanging relationship with said risers for a fluid to be heated, conduit means communicating with said compartments for circulating said fluid therethrough, said sections having inwardly projecting lower portions constituting respective knees at said lower level spaced apart by a horizontal gap, said members also including lower portions forming channels for said fluid in communication with said compartments, said channels sloping downwardly from said knees and terminating in lower extremities adjacent said outer surfaces, a supporting structure for said members forming with said lower portions a bottom chamber communicating with said central chamber through said gap and extending substantially from one of said outer surfaces to the other, said lower portions further forming passages for said flue gases leading from said bottom chamber to said risers, means for introducing a fuel into at least one of said chambers for combustion therein to produce said gases, substantially horizontal exhaust-duct means for said flue gases communicating with said risers above said waist, substantially horizontal lower header means communicating with said channels at said lower extremities, and substantially horizontal upper header means communicating with said compartments above said waist, each of said members being provided in the region of said knees with a horizontal fire chamber interconnecting said passages thereof and extending substantially parallel to said vertical plane, said central chamber partly overlying said fire chambers, said members being provided within said risers with sets of sloping guide fins of opposite pitch for said flue gases mounted on thermally conductive wall portions of said sections bounding said compartments.

2. A boiler according to claim 1 wherein each of said members has a width transverse to said plane at said waist which is less than half the width of said central chamber.

3. A boiler according to claim 1 wherein said lower portions are provided with nozzle means for directing a flow of secondary air along the undersides of said channels.

4. A boiler according to claim 3 wherein said nozzle means comprises a set of downwardly directed nozzles on each of said lower portions.

5. A boiler according to claim 1, further comprising a low-pitched fuel grate located in said bottom chamber below said knees and spaced from said lower portions.

6. A boiler comprising a pair of horizontally spaced members substantially symmetrical about a vertical plane, said members being divided into generally tubular sections and having substantially straight vertical outer wall surfaces and facing inner wall surfaces which approach each other at an upper and a lower level and recede from each other at a narrow waist between said levels, thereby forming a generally cylindrical, horizontally extending central chamber between them, said sections being bounded between said outer and inner wall surfaces by thermally conductive vertical partitions lying in planes transverse to the major dimension of said central chamber, the partitions of adjacent sections being spaced from each other and forming risers for ascending hot flue gases, the interior of said sections constituting compartments in heat-exchanging relationship with said risers for a fluid to be heated, conduit means communicating with said compartments for circulating said fluid therethrough, said sections having inwardly projecting lower portions constituting respective knees at said lower level spaced apart by a horizontal gap, said members also including lower portions forming channels for said fluid in communication with said compartments, said channels sloping downwardly from said knees and terminating in lower extremities adjacent said outer surfaces, a supporting structure for said members forming with said lower portions a bottom chamber communicating with said central chamber through said gap and extending substantially from one of said outer surfaces to the other, said lower portions further forming passages for said flue gases leading from said bottom chamber to said risers, means for introducing a fuel into at least one of said chambers for combustion therein to produce said flue gases, substantially horizontal exhaust-duct means for said flue gases communicating with said risers above said waist, substantially horizontal lower header means communicating with said channels at said lower extremities, and substantially horizontal upper header means communicating with said compartments above said waist, each of said members being provided in the region of said knees with a horizontal fire chamber interconnecting said passages thereof and extending substantially parallel to said vertical plane, said central chamber partly overlying said fire chambers, each of said compartments comprising a pair of horizontally spaced upstanding manifolds interconnected by a plurality of vertically spaced conduits, the lowermost ones of said conduits constituting said channels and defining said fire chambers with the second-lowest conduits, at least some of said conduits being externally provided with sets of oppositely pitched guide fins for said flue gases.

References Cited in the file of this patent

UNITED STATES PATENTS

| | | |
|---|---|---|
| 1,045,668 | Boies et al. | Nov. 26, 1912 |
| 1,232,587 | MacMullen et al. | July 10, 1917 |
| 1,541,355 | Howell | June 9, 1925 |

FOREIGN PATENTS

| | | |
|---|---|---|
| 1,640 | Great Britain | 1913 |
| 163,228 | Switzerland | Oct. 2, 1933 |